United States Patent [19]

Kaes

[11] 4,113,616

[45] Sep. 12, 1978

[54] FISH MANURE REMOVAL METHOD

[76] Inventor: Richard W. Kaes, 910 Robertson St., Buhl, Id. 83316

[21] Appl. No.: 818,946

[22] Filed: Jul. 25, 1977

[51] Int. Cl.² .................. B01D 21/00; B01D 29/10
[52] U.S. Cl. ................................. 210/67; 210/73 R; 210/83; 210/84; 210/169; 210/303; 210/304; 210/312; 210/416 AS; 210/512 M; 210/525
[58] Field of Search ................. 210/65, 83, 84, 169, 210/294, 295, 303, 304, 312, 416 AS, 512 R, 512 M, 513, 525, 532 R, 73 R

[56] References Cited

U.S. PATENT DOCUMENTS

| | | | |
|---|---|---|---|
| 2,820,548 | 1/1958 | Marcus et al. | 210/416 AS |
| 2,923,954 | 2/1960 | Babcock | 210/169 |
| 3,734,853 | 5/1973 | Horvath | 210/169 |
| 3,890,229 | 6/1977 | Eder | 210/512 R |
| 4,052,960 | 10/1977 | Birkbeck et al. | 210/169 |

*Primary Examiner*—Frank Sever
*Attorney, Agent, or Firm*—Frank J. Dykas

[57] ABSTRACT

The apparatus for removing fish manure from fish ponds of this invention comprises a movable vacuum chamber for receiving fish manure and solids suspended in water connected to a settling tank and separators by a suction hose.

1 Claim, 7 Drawing Figures

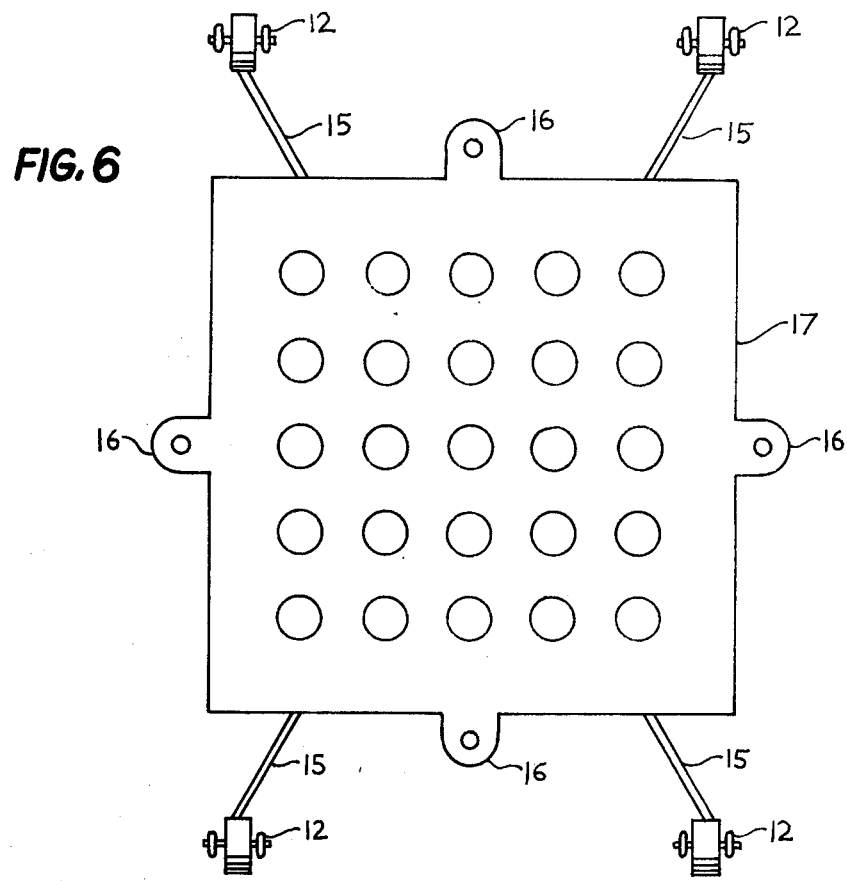

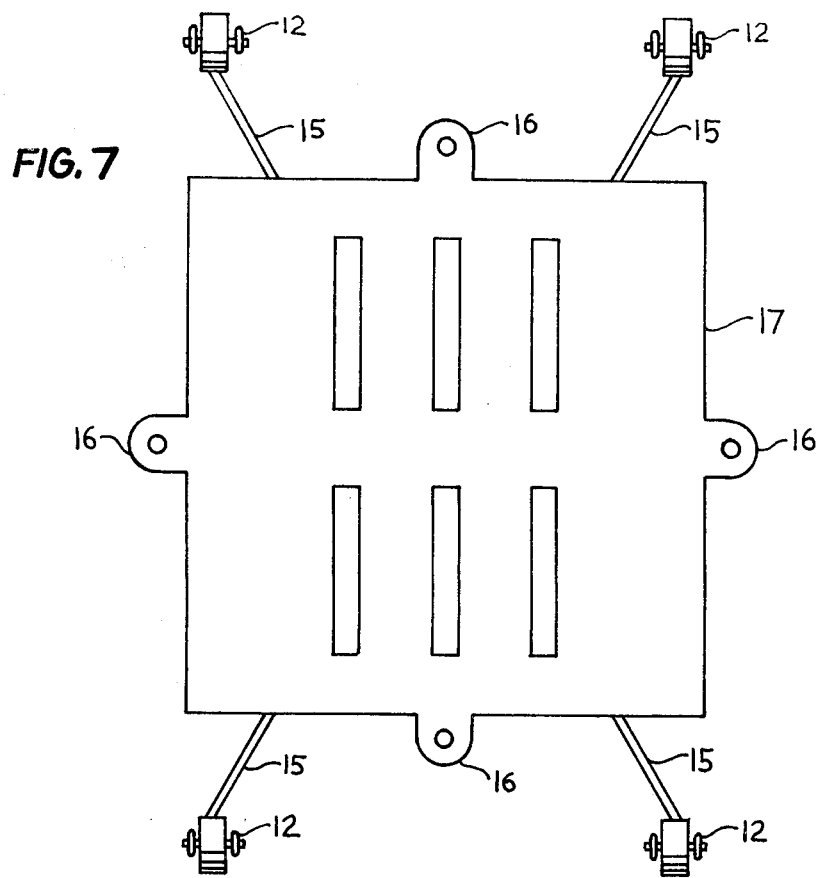

FISH MANURE REMOVAL METHOD

FIELD OF INVENTION

A combination of a vacuum chamber and filter-separators for the removal of fish manure and other sediment from the bottom of fish ponds and for the separation of the fish manure for drying and processing into a commercial fertilizer.

DESCRIPTION OF PRIOR ART

This invention relates to an apparatus for concurrently vacuuming the bottom of a fish pond to remove fish manure and other sediment therefrom and separating the fish manure from water and other sediment so that it may be economically dried and processed into commercial fertilizer or other products.

Over the past years, governmental agencies and some private concerns have been involved in the business of raising fish for the purposes of restocking sportmen's waters with game fish. During the process of developing this method of insuring an adequate supply of game fish, a commercial benefit has evolved. As of the present date there are businesses which raise fish which are processed and sold as food.

Businesses which raise fish are often termed fish farms. The physical requirements for raising fish involve a secure and continuous source of relatively constant temperature water which can be diverted through a series of fish ponds. Fish ponds vary in size from a few feet in width and several feet in length by two or three feet in depth, to ponds the size of olympic swimming pools. The normal procedure is for water to be forced in at one end of the pond, to run the length of the pond, and to exit through a series of screens and over a small dam, to drain directly into a river, lake, canal or to drain into larger fish ponds, and eventually into a river or lake. Fish hatched from eggs are deposited in the smallest ponds where they are fed and allowed to grow. Fish exercise by swimming against the current of water flowing through the pond. As the fish grow larger, they are transferred by means of nets, aqueducts, pumps or gates and channels, from one pond to another, eventually ending up in the largest ponds which are usually at the lowest elevation in the fish farm complex. Many thousands of fish are stored in each of the fish ponds and the amount of food consumed is considerable. The manure from the fish usually settles to the bottom of the pond. The size of the manure particles varies with species of fish and their size. If adequate care is not taken to remove this manure from the pond, it accumulates, eventually reducing the depth of the pond, and overflowing from one pond to another. Eventually all ponds overflow with manure and the sediment begins to wash out into the river or lake. The Environmental Protection Agency of the United States Federal Government has now taken action as has State Environmental Protection Agencies to reduce the amount of fish manure being deposited in river and lake beds, this being a cause of environmental pollution.

The prior art of cleaning or removing this fish manure has to date been extremely simple, basic and resembles the method of cleaning settling tanks at sewage processing plants. That is, that the fish ponds are drained and the fish manure is allowed to dry in the open sunlight and air. After the fish manure has dried, it is shoveled out, either by hand or by earth moving equipment, and deposited in a drying bin or pile where it is further dried. It is then passed through a crusher where it is pulverized to the necessary consistency for the various fertilizer applications; packaged, processed, and sold as commercial fertilizer.

Under this prior art procedure or process for removing the fish manure, there are substantial costs incurred by taking a fish pond out of service for considerable periods of time so that it can be drained and dried. It is not economically feasible to drain a pond and remove the manure until it accumulates to several inches in thickness or until the fish are removed for other reasons. The result of this is that often times, the manure in the pond will overflow into the river or another pond prior to the pond's being taken out of service.

It is therefore the primary object of this invention to disclose a combination tool and process wherein there is no requirement to drain the pond or to remove it from service while fish manure is being removed from the bottom of the pond. Another object of this invention is to provide a process whereby the fish manure in the fish pond sediment may be separated from small rocks, sand and other debris which may have settled to the bottom of the pond, and to separate the fish manure from the water taken up by the vacuum apparatus. Another object of this invention is to make it economically desirable to further reduce the amount of sediment at the bottom of each fish pond, thereby reducing the amount of contaminents overflowing the pond and entering the river or lake bed to which the water from the fish ponds drains by providing a commercially feasible means of recovering the fish manure for resale and use.

It is another object of this invention to provide an economically feasible and reliable tool which is simple to manufacture, and requires the minimum amount of labor to operate and can be used while the fish pond is in service.

SUMMARY OF THE INVENTION

The invention attains its objects by providing a vacuum chamber connected to the suction side of a suitable pump; the chamber is downwardly open and supported at a predetermined elevation above the bottom of the fish pond to be cleaned on four casters, which are freely rotatable so that the vacuum apparatus may be guided in any direction along the bottom of the fish pond. Interchangeable plates having a plurality of holes in various configurations suitable for the suction of various types and sizes of fish manure are attached to the downwardly open, suction side of the suction chamber. These plates are interchangeable so that various plates may be used to achieve the object of passing through various sizes and shapes of fish manure without sucking into the separating and filtration apparatus the fish or other extraneous matter. The fish manure and other sediment which is able to pass through the plurality of holes in the plate attached to the downwardly open end of the vacuum chamber, pass through the vacuum chamber, through a hose or pipe, through the first stage pump to the settling tank mounted on the filtration assembly frame.

As will be described in the preferred embodiment, the filtration assembly frame is portable, preferably of a type similar to a utility trailer or cart, so that it can be moved throughout the fish farm complex as needed. Attached to it in addition to the settling tank, are the various separators and filters and pumps.

The various pumps, separators and filters, and the settling tank, collectively known as the filtration assembly are mounted on the filtration assembly frame. It is designed for multiple stages of separating filtering.

The first stage is the settling tank, wherein heavy sand, rocks, pebbles and other debris heavier than the fish manure settle to the bottom of the settling tank for eventual removal and disposal. The lighter fish manure remains suspended in the water, and exits the settling tank, passing through a second stage pump to the second stage of the filtering process, centrifugal type separators such as hydrocyclones.

In the second stage, particles, consisting primarily of fish manure, are removed from fish manure-water suspension and collected for removal from the filtration assembly.

The fish manure-water suspension then passes through basket type filters wherein the remainder of the suspended particles larger than a few microns, which is again primarily fish manure, are filtered out, and collected for later removal.

The effluent water from the filtration assembly is then returned to the fish pond.

The result is the collection of fish manure which is of sufficient purity and low water content to be commercially processable into fertilizer or other products. The major features, objects and advantages of this combination suction and filtering device will become apparent from the detailed description of the preferred embodiment thereof.

BRIEF DESCRIPTION OF THE ACCOMPANYING DRAWINGS

The preferred embodiment of the invention is illustrated in the accompanying drawings, wherein:

FIG. 6 is a bottom view showing one embodiment of the bottom plate of the vacuum chamber.

FIG. 7 is another embodiment of the bottom plate of the vacuum chamber.

Figure 1:
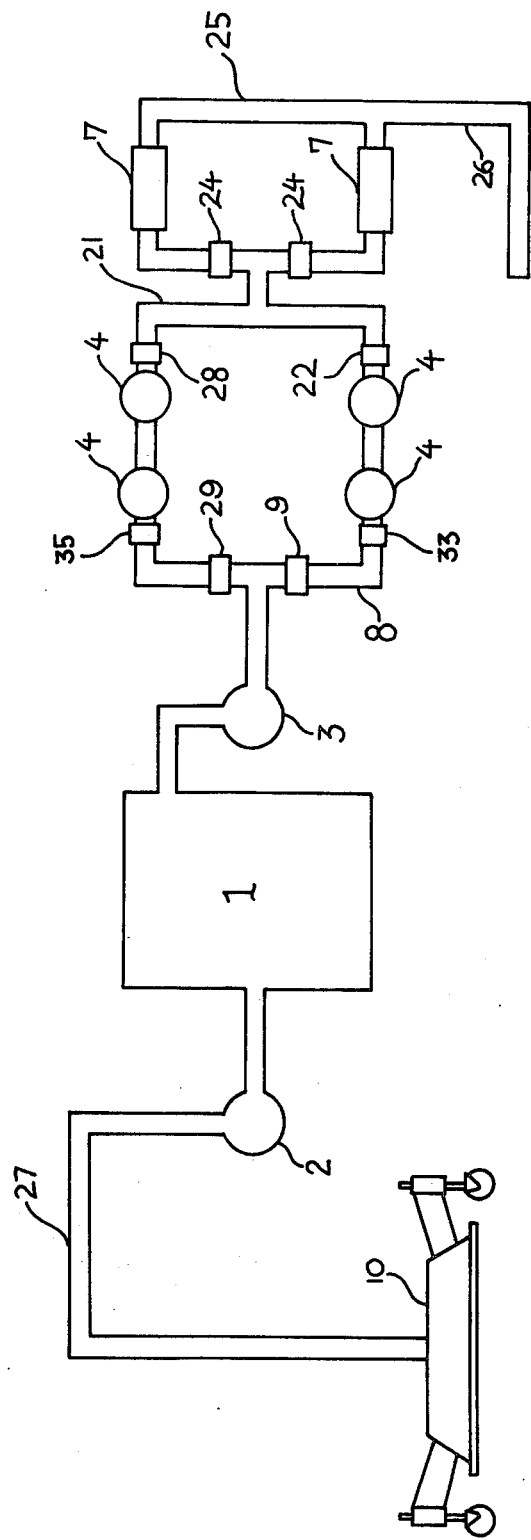
FIG. 1 is a block diagram showing the vacuum chamber in combination with the pumps, settling tank, separators and final filter units.
Figure 3:
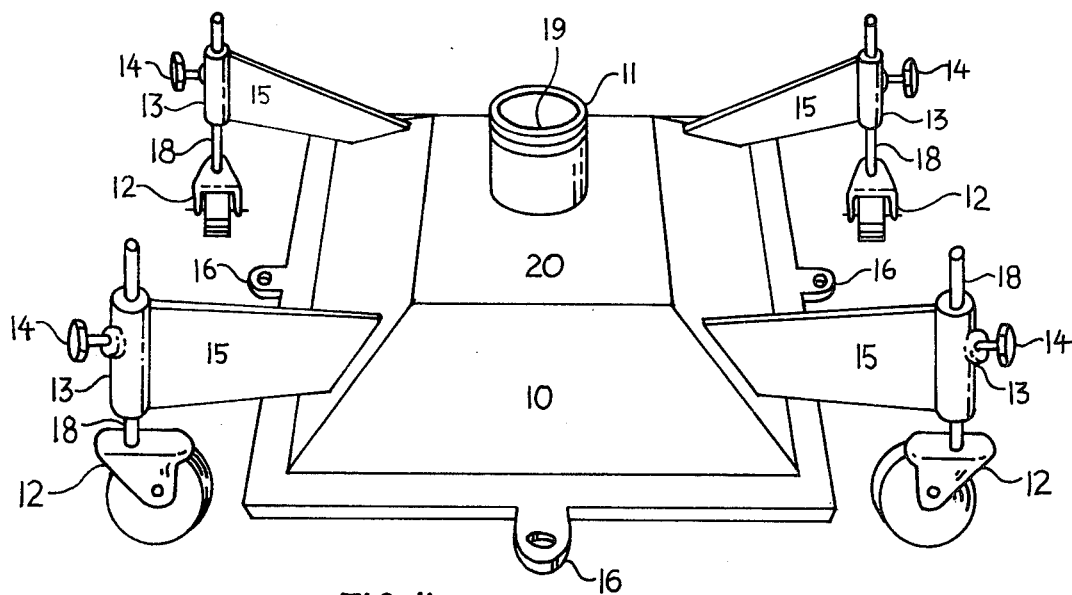
FIG. 3 is a perspective view of the vacuum chamber unit of the invention.

DESCRIPTION OF PREFERRED EMBODIMENT:

Referring now to the drawings and more particularly to FIGS. 1 and 3, the vacuum chamber of this invention is generally shown by the numeral 10. At the center of top plate 20 is attached a collar 11 defining hole 19 which is adapted to receive suction hose 27 through which fish pond water and suspended solids may pass through to the first stage pump 2.

The vacuum chamber 10 is supported by means of four radial arms 15 to which assemblies 13 are connected. By the use of locking screws 14, rods 18 and caster assemblies 12, the height of the vacuum chamber above the fish pond floor may be raised or lowered to accommodate the vacuuming of various depths of fish manure and other solids from the bottom of the fish pond.

Figure 4:
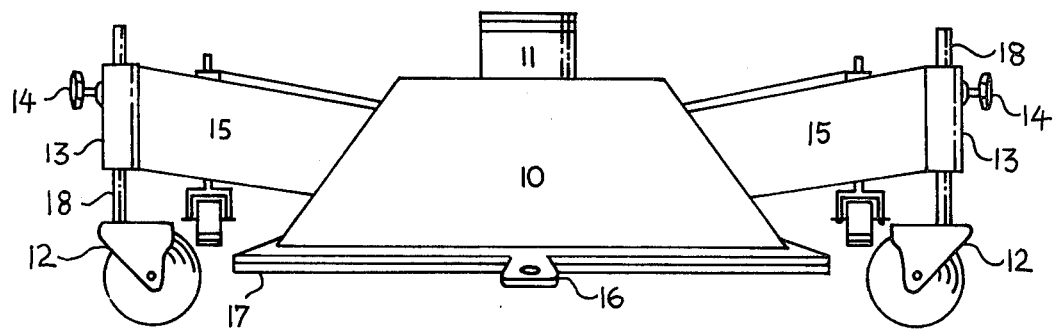
FIG. 4 is a side view of the vacuum chamber.
Figure 5:
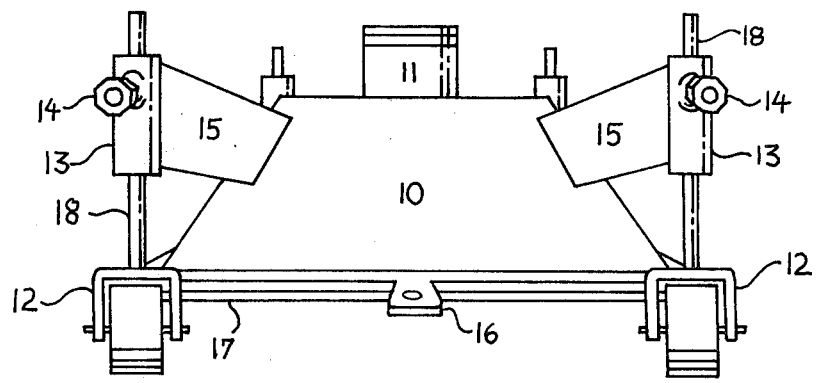
FIG. 5 is an end view of the vacuum chamber.

Referring now to FIGS. 4 and 5, it can be seen that the radial arms 15 are positioned in such a manner that the caster assemblies 12 will not extend beyond the outer extremities of the suction plate 17, thereby facilitating vacuuming along the edges of the fish pond. It should also be noted that eyelets 16 are provided on all four sides of vacuum chamber 10 to provide means for attaching a propelling device such as ropes or wires to the vacuum chamber 10. In practice it has been found that use of a hard plastic material for suction hose 27 will provide sufficient control for moving vacuum chamber 10 across the bottom of fish ponds.

Referring to FIGS. 6 and 7 it is seen that suction plate 17 is removably attached to vacuum chamber 10. Both FIGS. 6 and 7 show various preferred embodiments of suction plate 17. FIG. 6 shows a plurality of round holes and FIG. 7 shows a slot configuration. By the selection of the suction plate 17 with the appropriate sized and configured holes the operation can prevent litter and fish from being sucked into the vacuum chamber 10 when it is being used to clean a fish pond containing fish.

Figure 2:
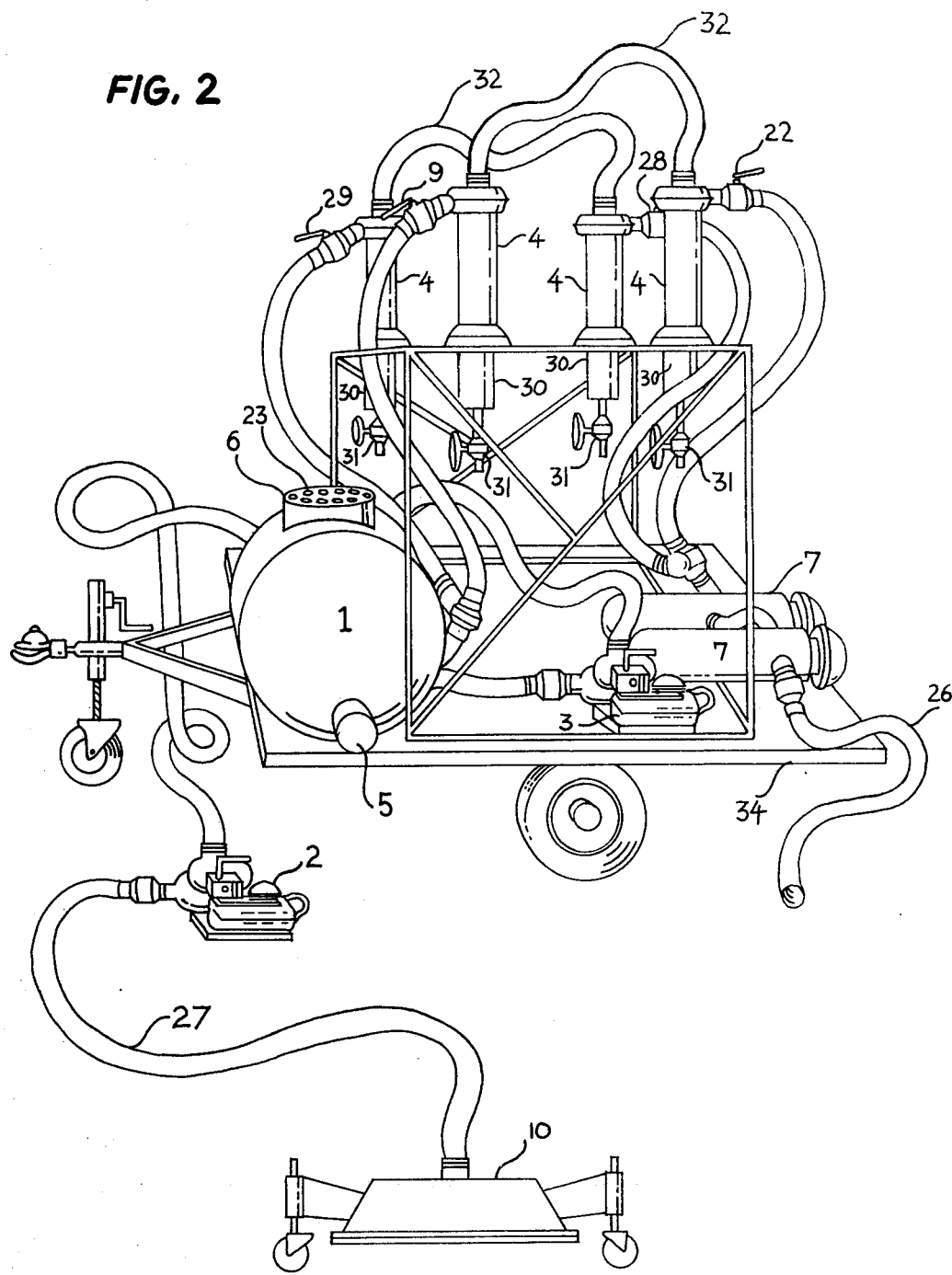
FIG. 2 is a perspective view of the filtration assembly mounted on filtration assembly frame.

Now referring to FIGS. 1 and 2, it can be seen that the water and suspended solids vacuumed from the fish pond floor by the vacuum chamber 10 pass through suction hose 27 and the first stage pump 2 to the settling tank 1. Access door 6 is left cracked open during the filtration system start-up to allow venting air to escape from the system during start-up since the entire filtration system will eventually become filled with water and suspended solids and pressurized by the first stage pump 2. Once the settling tank 1 has been fully filled, a plurality of bolts 23 are tightened to seal access door 6.

Drains 5 are provided on the settling tank 1 to facilitate the periodic clean out of sand, pebbles and other debris which has settled to the bottom of the settling tank 1.

The fish manure-water suspension exiting the settling tank 1, passes, under pressure of the first stage pump 2, to the second stage pump 3 where the system pressure is further increased to maximize the efficiency of centrifugal type separators 4.

The fish manure-water suspension, exiting the second stage pump 3, passes through manifold 8 and through either shut off valves 9 or 29 into the centrifugal type separators 4; fish manure and other previously suspended solids are collected in the collection cups 30 shown in FIG. 2. This collected fish manure is periodically removed from the separators 4, while the system is in operation and under pressure by opening blowdown valves 31.

The effluent water together with any remaining fish manure that may be suspended in it, then passes through either isolation valve 22 or 28 to manifold 21, and from there through the final filters 7 where particles of a few microns in size or larger are filtered out.

The remaining effluent water then passes through manifold 25 into discharge hose 26 for return to the fish pond.

Referring now to FIG. 2, it is seen that the entire filtration assembly is mounted on the filtration assembly frame 34, which in this the preferred embodiment is a utility trailer. It should be noted that the centrifugal type separators 4 are mounted high enough above the base of the filtration assembly frame 34 to allow hoses to be connected to the blowdown valves 31 in such a manner as to facilitate dumping of the fish manure from the collection cups 30 with a minimum amount of water and system pressure.

Isolation valves 24 are provided to facilitate the placing in and out of service and cleaning of filters 7.

If any of the separators 4 become inoperable by reason of clogging with solids, they may be back flushed while the system is in operation by the closures of appropriate isolation valves 9 and 22 or 29 and 28. The series of separators which contains the clogged separator may then be depressurized by opening the appropriate blowdown valve 31. Once the system is depressurized, the appropriate flexible hose 32 may be broken apart by means of quick disconnect 33 or 35.

After flexible hose 32 is broken, isolation valve 22 or 28 may be opened allowing water from side of the centrifugal type separator system still in operation to pass through manifold 32 to back flush the clogged separator 4. The flushed separators 4 may then be placed back into service by reversing the procedure.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence it is intended that the scope of the invention be limited only to the extent indicated in the appended claims.

I claim:

1. A method for recovering fish manure in amounts sufficient for commercial use, from a fish pond, by means of a portable, self-contained apparatus, said method comprising:
    (a) sucking a quantity of a suspension of fish manure and other solids through a movable vacuum chamber which comprises a plate having a plurality of holes suitably sized to prohibit the passage of fish therethrough, said vacuum chamber being attached to the remaining elements of said apparatus by a long flexible conduit means;
    (b) passing said quantity through said conduit means by vacuum, to a settling tank; said settling tank being suitably sized to provide a period of time sufficient to allow pebbles, sand and other heavy debris to come out of suspension from said quantity and fall to the bottom of the settling tank;
    (c) pumping the remainder of said quantity from said settling tank through hydrocyclone means, to provide a dewatered fish manure underflow stream and an effluent water overflow stream;
    (d) passing said effluent water overflow stream through basket filter means, so as to remove residual fish manure therefrom;
    (e) combining said residual fish manure and said dewatered fish manure underflow stream to provide said amount suitable for commercial use.

* * * * *